(12) United States Patent
Akita et al.

(10) Patent No.: US 10,847,882 B1
(45) Date of Patent: Nov. 24, 2020

(54) ELECTRONIC DEVICE AND COMMUNICATION METHOD

(71) Applicant: KABUSHIKI KAISHA TOSHIBA, Tokyo (JP)

(72) Inventors: Koji Akita, Yokohama (JP); Toshihisa Nabetani, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/816,427

(22) Filed: Mar. 12, 2020

(30) Foreign Application Priority Data

Sep. 13, 2019 (JP) .................. 2019-167690

(51) Int. Cl.
| | | |
|---|---|---|
| *H01Q 1/42* | (2006.01) | |
| *H01Q 1/44* | (2006.01) | |
| *H01Q 19/10* | (2006.01) | |
| *H01Q 21/06* | (2006.01) | |
| *H01Q 5/307* | (2015.01) | |
| *H04B 7/185* | (2006.01) | |
| *H01Q 1/28* | (2006.01) | |

(52) U.S. Cl.
CPC ............ *H01Q 5/307* (2015.01); *H01Q 21/06* (2013.01); *H04B 7/185* (2013.01); *H01Q 1/28* (2013.01)

(58) Field of Classification Search
CPC ........ H01Q 19/10; H01Q 19/108; H01Q 1/02; H01Q 1/42; H01Q 1/422; H01Q 1/44; H01Q 21/06; H01Q 21/062; H01Q 21/24; H01Q 9/285
USPC .... 455/11.1, 13.3, 63.4, 82, 575.7; 343/360, 343/770; 370/329; 375/267
See application file for complete search history.

(56) References Cited

U.S. PATENT DOCUMENTS

| 4,994,813 A * | 2/1991 | Shiramatsu ............ H01Q 3/267 342/360 |
|---|---|---|
| 9,923,284 B1 * | 3/2018 | Loui .................. H01Q 15/0086 |
| 10,714,829 B2 * | 7/2020 | Raney .................. H05K 1/0203 |
| 2006/0152426 A1 * | 7/2006 | McGrath .................. H01Q 9/30 343/770 |
| 2014/0334565 A1 * | 11/2014 | Tzanidis ................ H01Q 21/20 375/267 |
| 2015/0016362 A1 * | 1/2015 | Negus .................... H04W 72/04 370/329 |
| 2016/0233588 A1 | 8/2016 | Bily et al. |
| 2017/0110801 A1 * | 4/2017 | Jan .......................... H01Q 9/285 |

(Continued)

FOREIGN PATENT DOCUMENTS

| JP | 2001135960 A | 5/2001 |
|---|---|---|
| JP | 2018505625 A | 2/2018 |
| WO | 2017006959 A1 | 1/2017 |

*Primary Examiner* — Tan H Trinh
(74) *Attorney, Agent, or Firm* — Holtz, Holtz & Volek PC

(57) ABSTRACT

According to one embodiment, an electronic device comprises first and second array antennas, and first and second wireless communication devices. An orientation of the first array antenna is different from an orientation of the second array antenna. A frequency band of the second wireless communication device is lower than a frequency band of the first wireless communication device. An electromagnetic wave power of the second wireless communication device is larger than an electromagnetic wave power of the first wireless communication device. A size or distance of antenna elements of the second array antenna is larger than a size or distance of antenna elements of the first array antenna.

12 Claims, 16 Drawing Sheets

(56) References Cited

U.S. PATENT DOCUMENTS

| | | | |
|---|---|---|---|
| 2018/0198197 A1* | 7/2018 | Toyao | H01Q 1/44 |
| 2019/0131706 A1* | 5/2019 | Raney | H01L 23/367 |
| 2019/0348768 A1* | 11/2019 | Behdad | H01Q 19/10 |
| 2020/0185818 A1* | 6/2020 | Kim | H01Q 1/3275 |

* cited by examiner

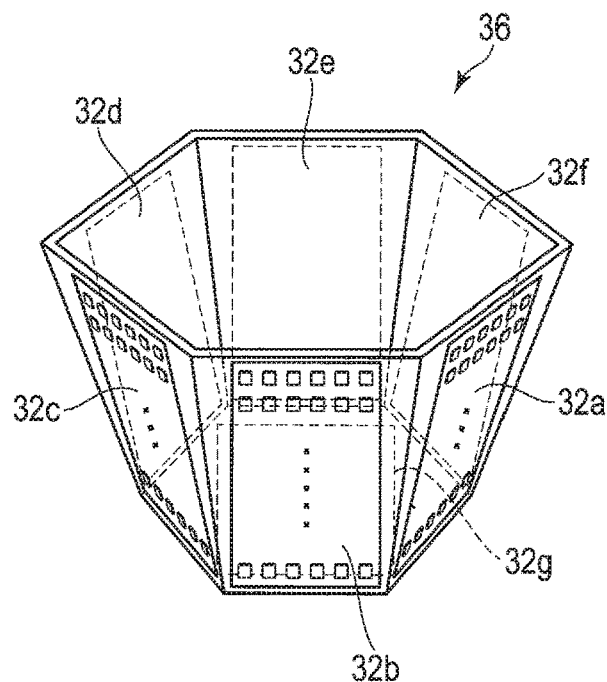
F I G. 3A
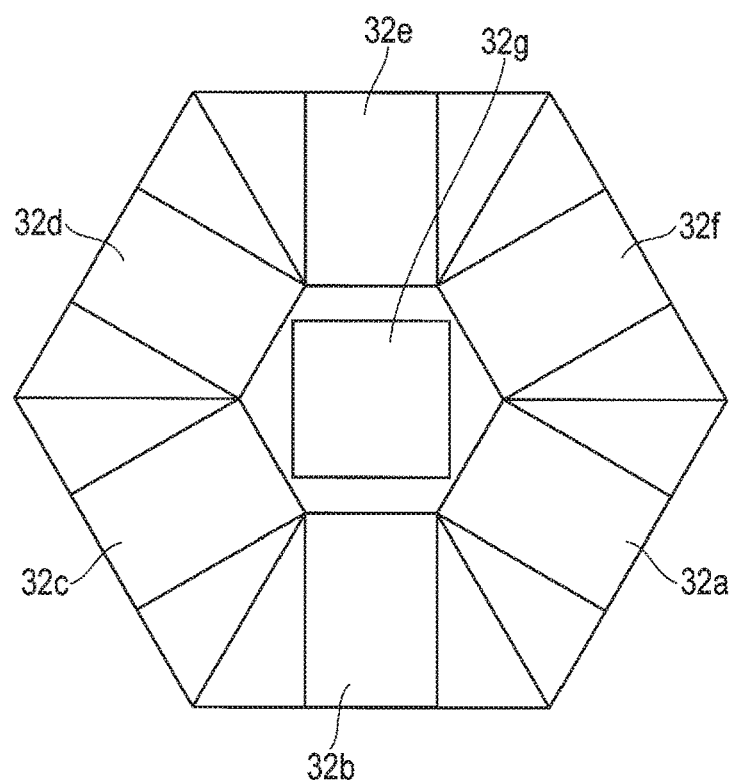
F I G. 3B

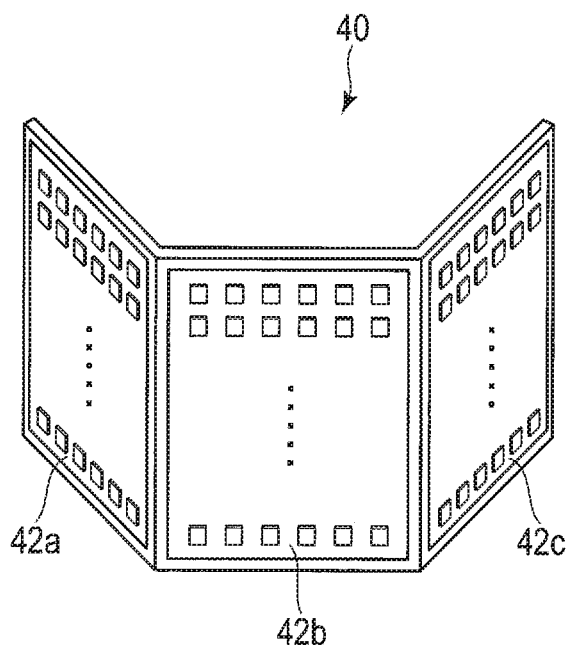
FIG. 4
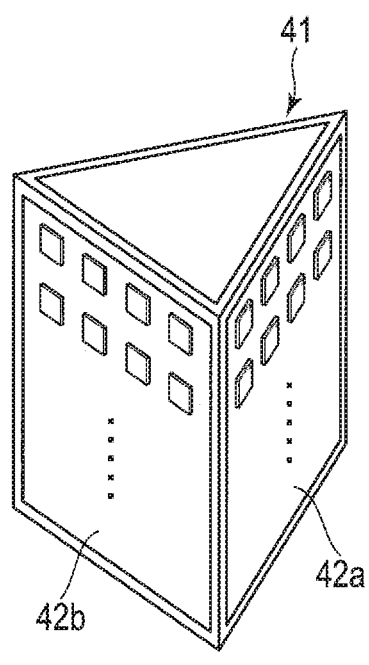 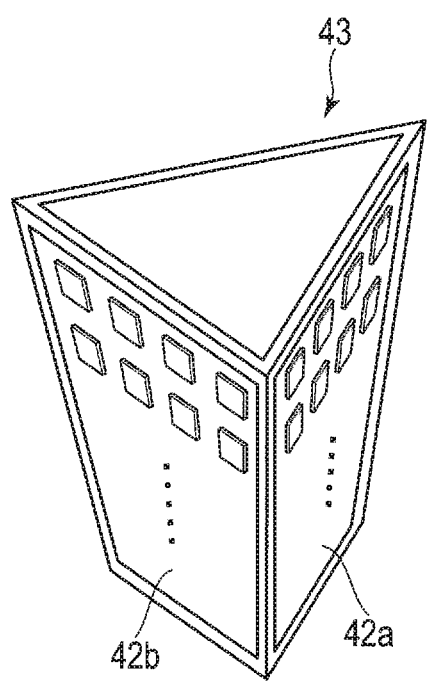
FIG. 5A  FIG. 5B

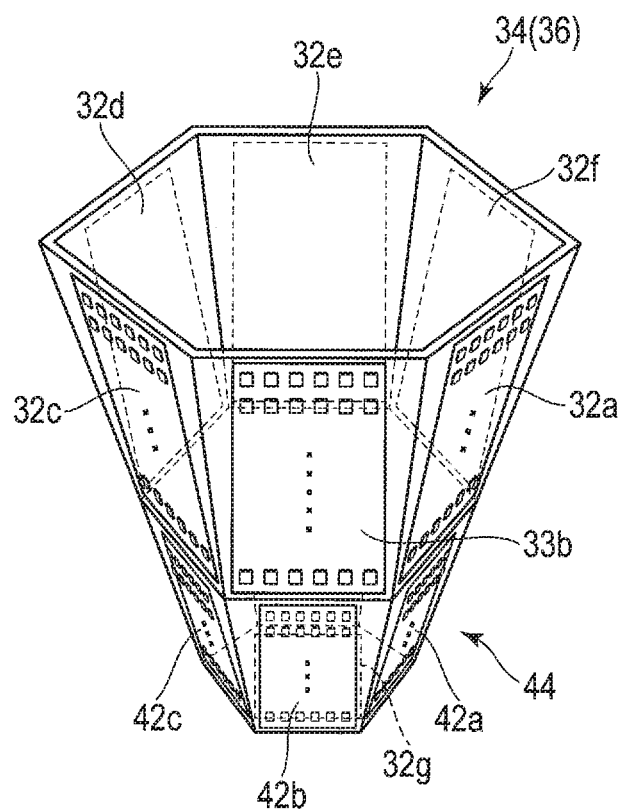
F I G. 7A
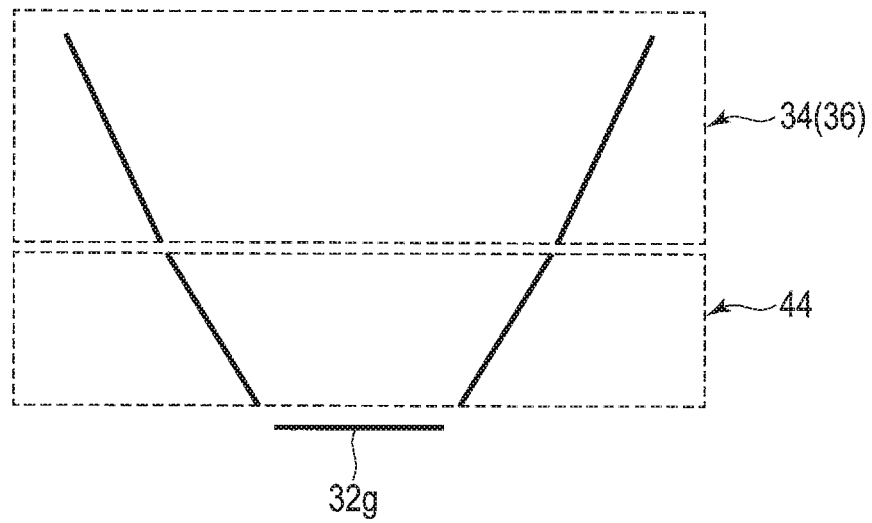
F I G. 7B

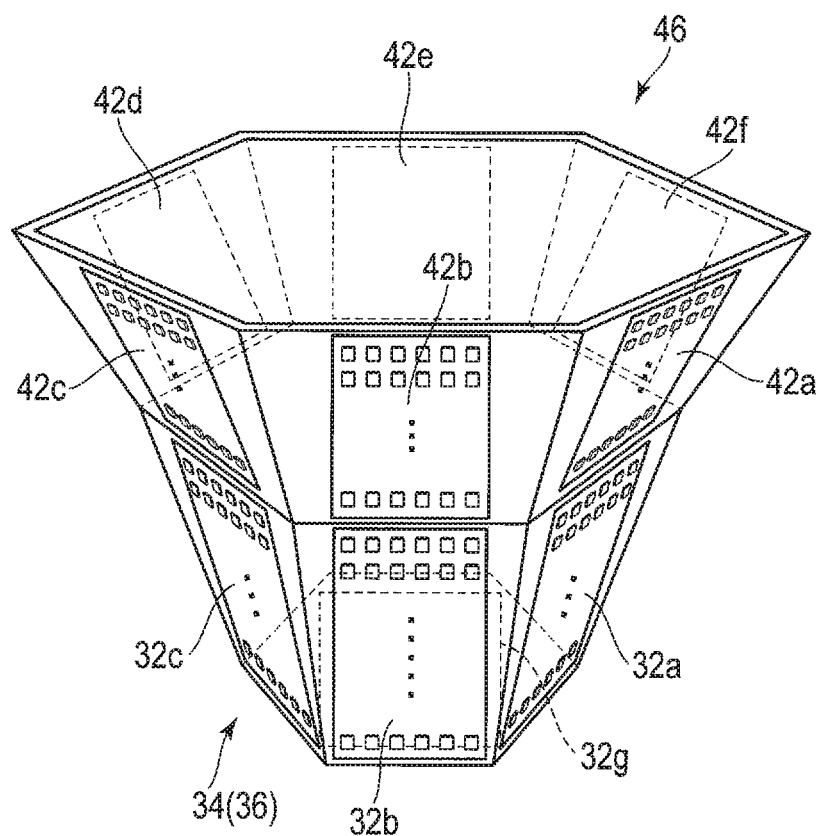
F I G. 8A
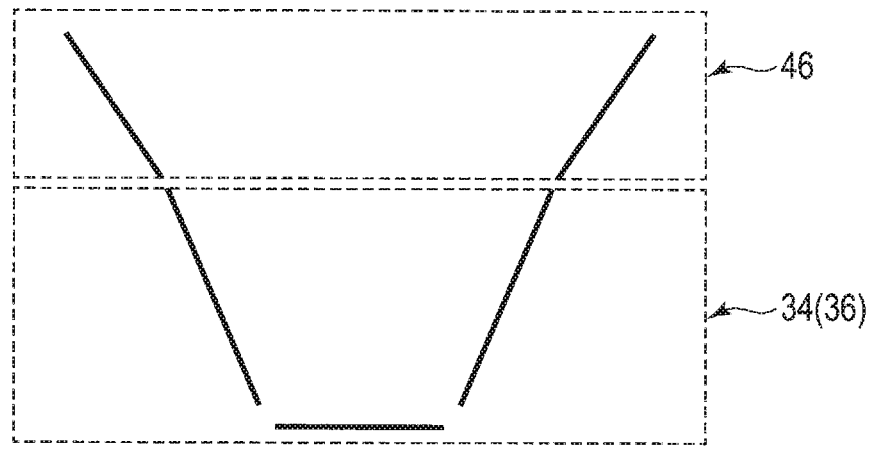
F I G. 8B

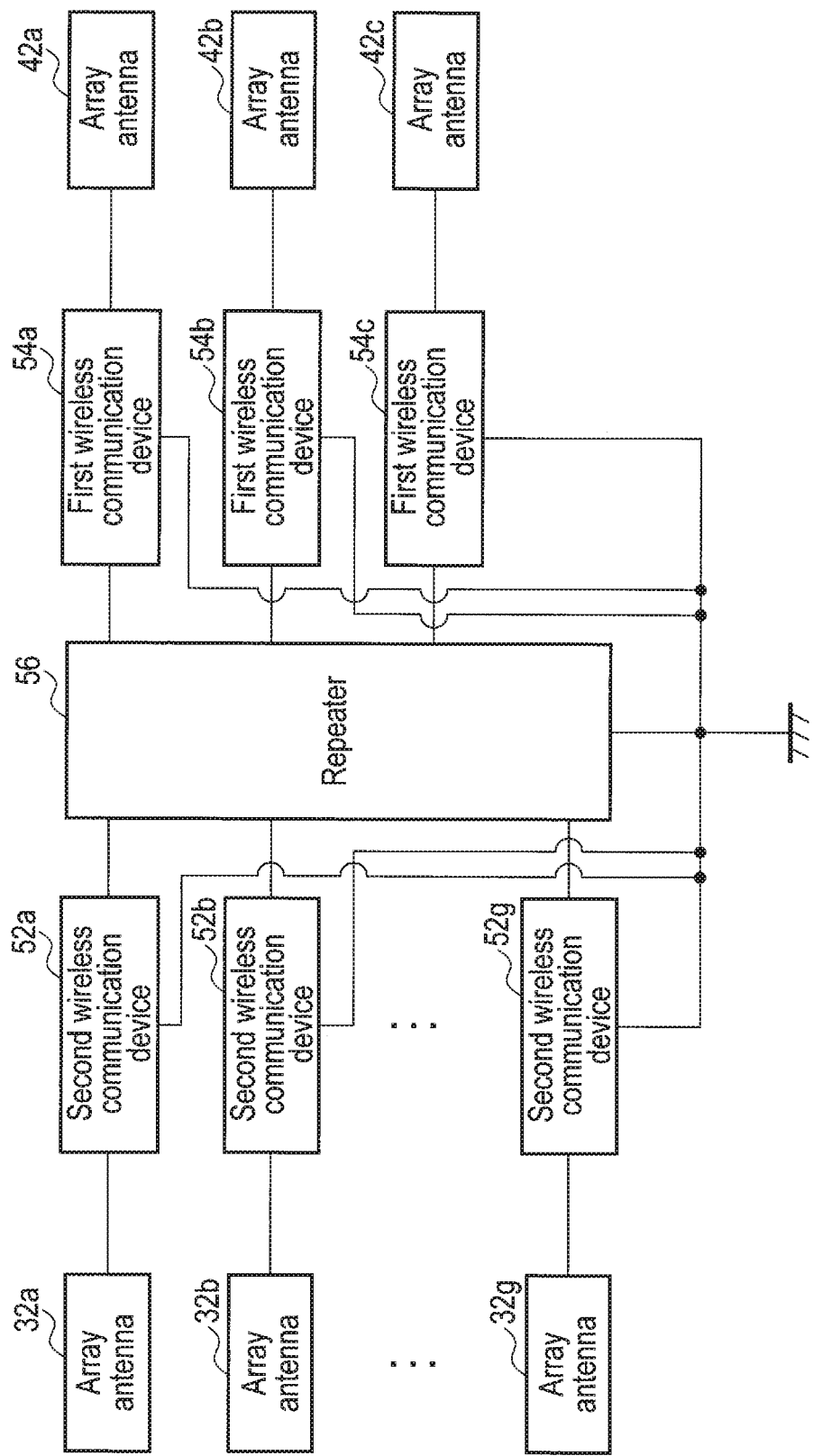
F I G. 9

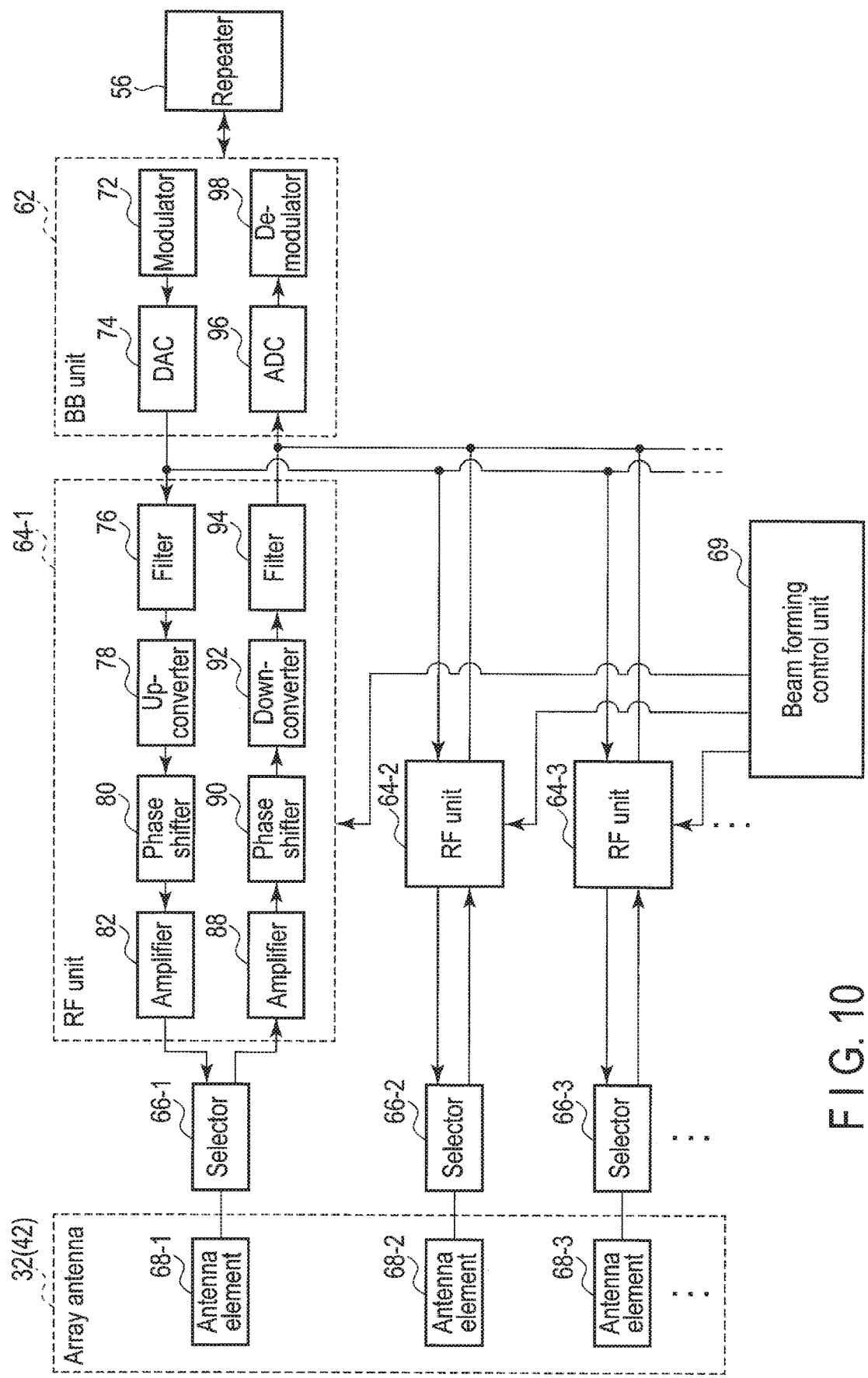
F I G. 10

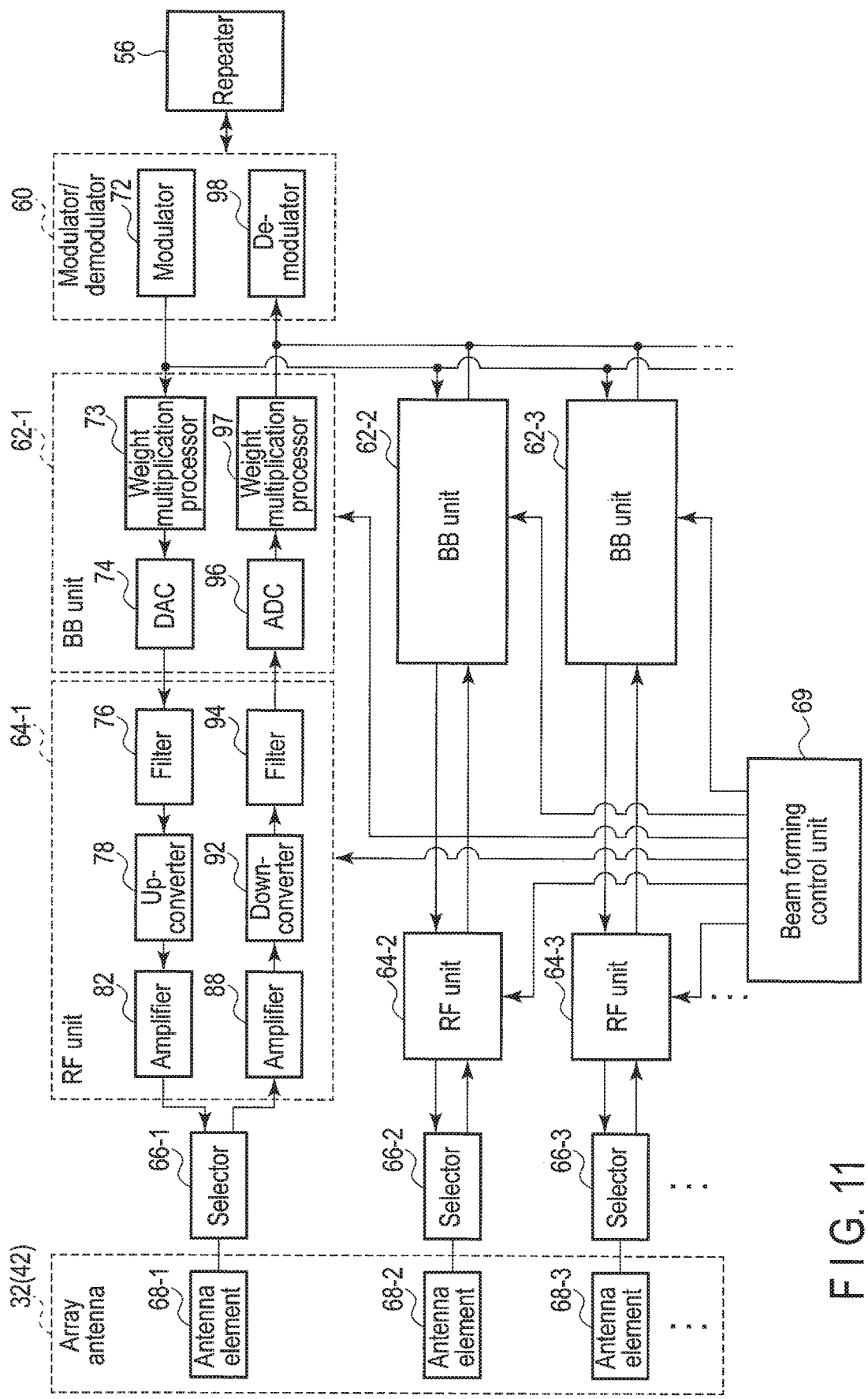
F I G. 11

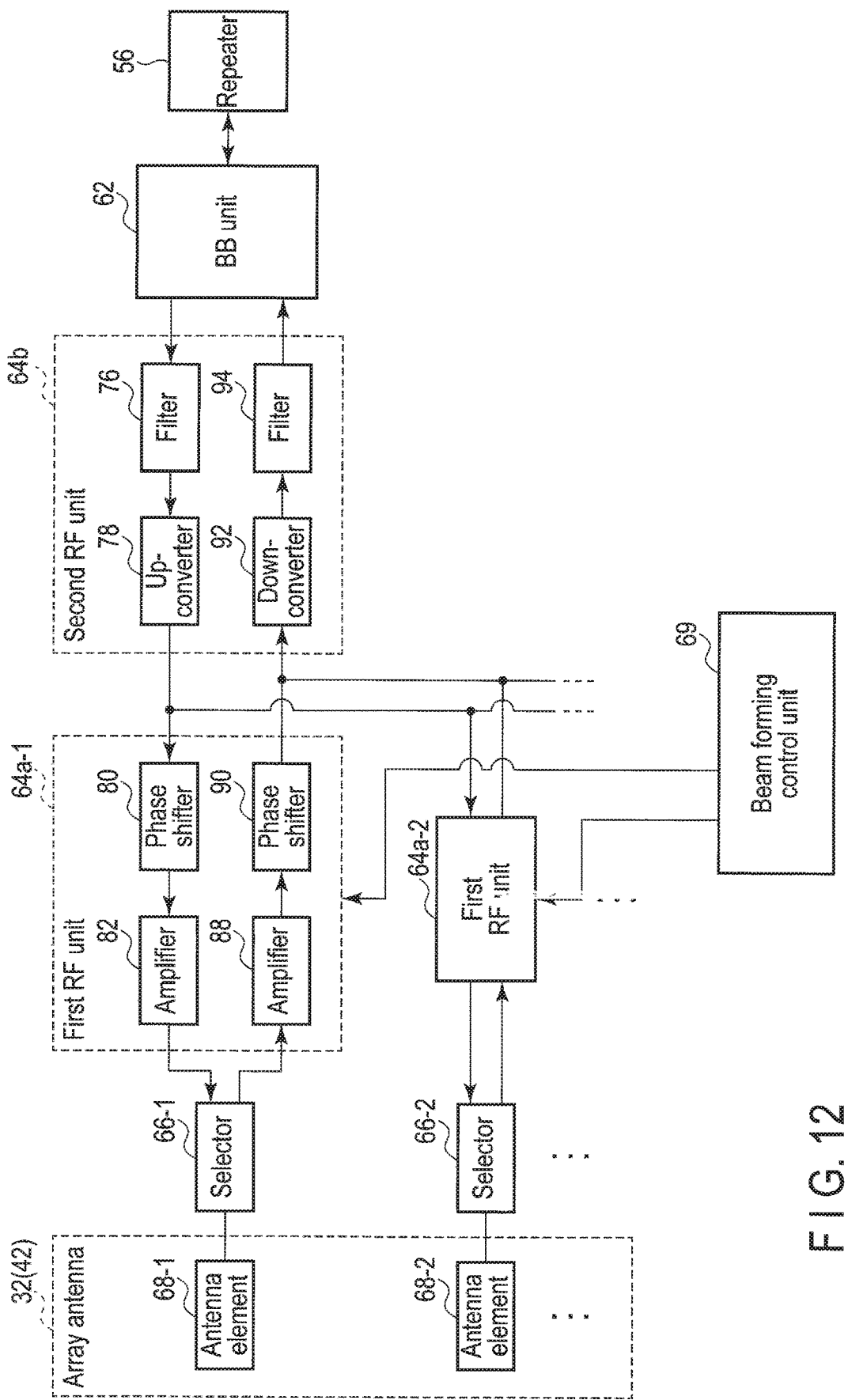
F I G. 12

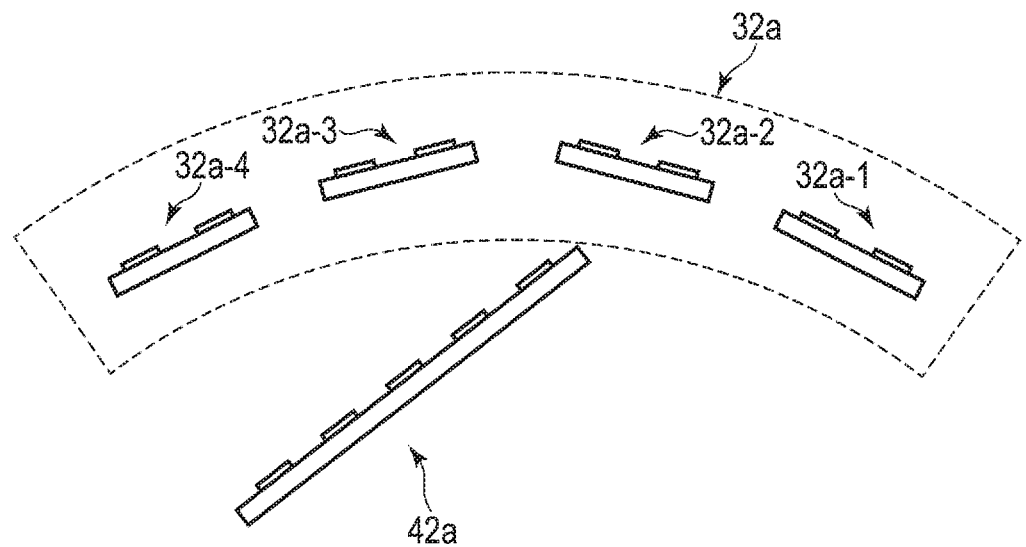
F I G. 17A
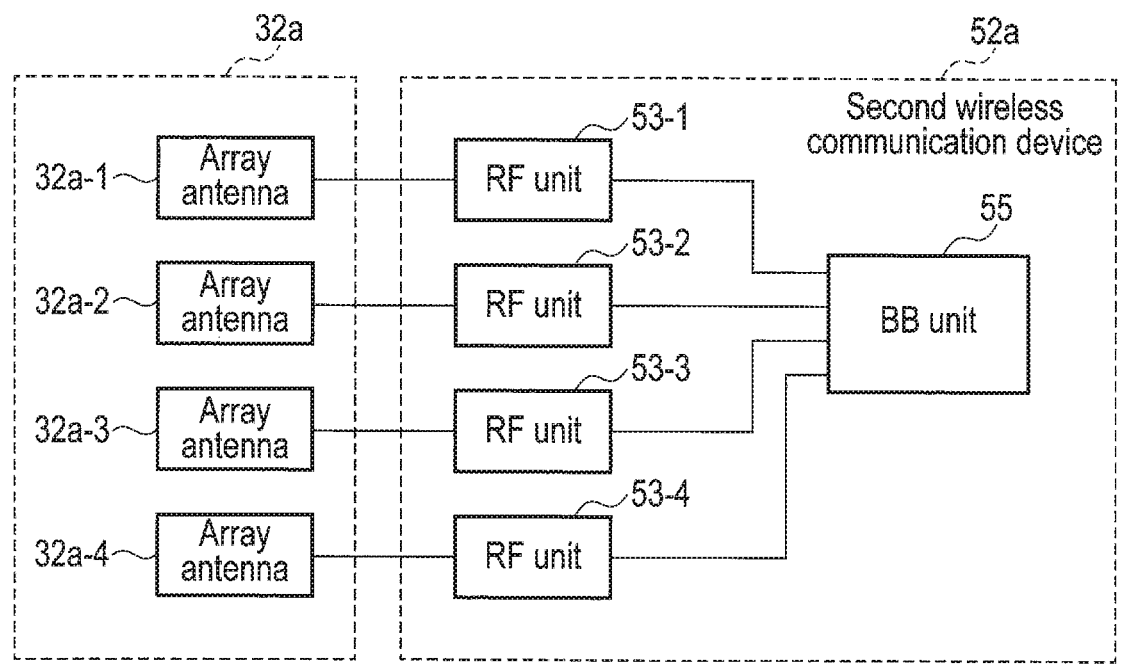
F I G. 17B

ELECTRONIC DEVICE AND COMMUNICATION METHOD

CROSS-REFERENCE TO RELATED APPLICATIONS

This application is based upon and claims the benefit of priority from Japanese Patent Application No. 2019-167690, filed Sep. 13, 2019, the entire contents of which are incorporated herein by reference.

FIELD

Embodiments described herein relate generally to an electronic device including array antennas and method.

BACKGROUND

An example of an electronic device including array antennas is a wireless communication relay device. In wireless communication, an electromagnetic wave is generally transmitted between a wireless communication device and another wireless communication device. An example of wireless communication includes cellular communication. In cellular communication, wireless communication is performed by directly transmitting an electromagnetic wave between a base station device and terminal devices.

In some cases, a wireless relay device is arranged between a base station device and terminal devices, and an electromagnetic wave is relayed by the wireless relay device. The wireless relay device may be arranged on the rooftop of a building or a steel tower similarly to a normal base station device, or may be mounted on an automobile, an airship, a balloon, or the like. Communication can be enabled by using the wireless relay device even when the base station device and the terminal devices cannot directly transmit an electromagnetic wave because the distance between the base station device and the terminal devices is long or the wireless communication path is blocked by some object. Furthermore, in addition to the above case, when the base station device breaks down or when the number of terminal devices in a specific cell temporarily increases due to an event or the like, a wireless relay device may be used.

A wireless relay device includes a first wireless communication device that performs first wireless communication with a base station device and a second wireless communication device that performs second wireless communication with terminal devices.

In the wireless relay device, the second wireless communication device communicates with the terminal devices and first wireless communication device communicates with the base station device, of which the number is limited. Therefore, a power of electromagnetic wave (hereinafter referred to as an electromagnetic wave power) transmitted from the second wireless communication device is set larger than the electromagnetic wave power of the first wireless communication device. Wireless communication devices having a large electromagnetic wave power tend to generate more heat. For this reason, the second wireless communication device generates more heat than the first wireless communication device. The first wireless communication device and the second wireless communication device are arranged so that heat can be conducted between them. Therefore, the problem of the heat generated by the second wireless communication device is not limited to the problem closed in the second wireless communication device. The heat generated by the second wireless communication device also affects the first wireless communication device. A technique for achieving efficient heat dissipation as a whole wireless relay device is desired.

BRIEF DESCRIPTION OF THE DRAWINGS

FIGS. 3A and 3B are diagrams showing another example of the service link antenna device.

FIG. 4 is a diagram showing an example of a feeder link antenna device.

FIGS. 5A and 5B are diagrams showing another example of the feeder link antenna device.

FIGS. 7A and 7B are diagrams showing another example of arrangement of the service link antenna device and the feeder link antenna device.

FIGS. 8A and 8B are diagrams showing yet another example of arrangement of the service link antenna device and the feeder link antenna device.

FIG. 9 is a block diagram showing an example of a wireless relay device.

FIG. 10 is a block diagram showing an example of a wireless communication device.

FIG. 11 is a block diagram showing another example of the wireless communication device.

FIG. 12 is a block diagram showing still another example of the wireless communication device.

FIGS. 17A and 17B are diagrams showing yet another example of the service link antenna device.

DETAILED DESCRIPTION

Figure 1:
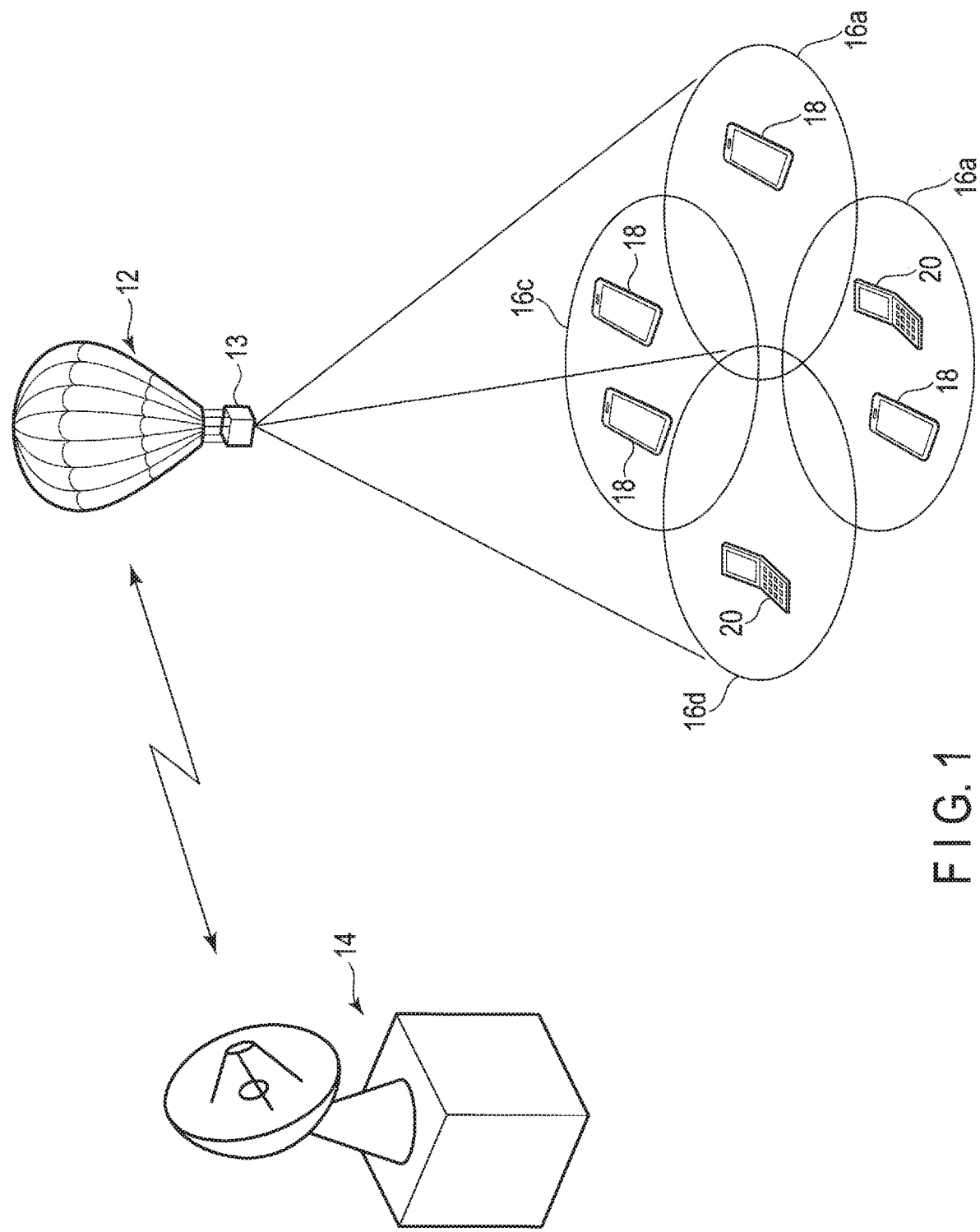
FIG. 1 is a diagram showing an example of a wireless communication system including an electronic device according to a first embodiment.

The embodiments will be described below with reference to the drawings. The following description exemplifies a device and a method for embodying a technical idea of the embodiments, and the technical idea of the embodiments is not limited to the structure, shape, arrangement, material, and the like of the components described below. Variations that can be easily devised by a person skilled in the art are naturally included in the scope of the disclosure. For the purpose of a clearer description, the size, thickness, planar dimensions, shape, or the like of each element may be schematically expressed in the drawings by modifying it with respect to the actual embodiments. A plurality of the drawings may include elements having dimensional relationships or ratios different from one another. In a plurality of the drawings, redundant descriptions may be omitted by giving same reference numerals to corresponding elements. Some elements may be given a plurality of names but examples of such names are merely illustrative and do not negate giving other names to those elements. It is not to be negated that an element that has not been given a plurality of names is given another name. In the following description, "connection/connect" means not only direct connection but also connection via another element such as wireless communication.

In general, according to one embodiment, an electronic device comprises a first array antenna comprising a plurality of first antenna elements on a first planar substrate; a first wireless communication device that communicates via a first frequency band by the first array antenna; a second array antenna comprising a plurality of second antenna elements on a second planar substrate, an orientation of the second planar substrate being different from an orientation of the first planar substrate; and a second wireless communication device that communicates via a second frequency band by the second array antenna. The second frequency band is lower than the first frequency band. A power of electromagnetic wave transmitted by the second wireless communication device is larger than a power of electromagnetic wave transmitted by the first wireless communication device. A size of the plurality of the second antenna elements or a distance of the plurality of the second antenna elements is larger than a size of the plurality of the first antenna elements or a distance of the plurality of the first antenna elements.

FIG. 1 shows an example of a wireless communication system including an electronic device of the first embodiment. Wireless communication between a wireless communication device and a base station device 14 is relayed by a wireless relay device (hereinafter, simply referred to as a relay device) 13. An example of the wireless communication device includes a smartphone 18 and a cellular phone 20. Note that the relay device 13 may perform wireless communication with not only the base station device 14 but also a wireless communication device equivalent thereto. The wireless communication device such as the cellular phone 20 may be a terminal device capable of communicating with the base station device 14.

Both the base station device 14 and the relay device 13 may be permanent equipment, meanwhile the relay device 13 may be temporary equipment for emergency response. The base station device 14 is installed on the ground, on the rooftop of a building, or on a steel tower. The relay device 13 may also be mounted on a rooftop of an automobile, an airplane, an airship, a balloon, or a satellite. In the example of FIG. 1, the relay device 13 is mounted on a balloon 12. When a certain base station device breaks down, or when the number of terminal devices in a specific area temporarily increases due to an event or the like, the balloon 12, the airship, or the vehicle equipped with the relay device 13 is moved to the broken down base station device or the specific area.

Wireless communication between the relay device 13 and the base station device 14 is referred to as a feeder link, and wireless communication between the relay device 13 and a wireless communication device such as the smartphone 18, the cellular phone 20, or the like is referred to as a service link. The relay device 13 includes an antenna and a wireless communication device for the service link and an antenna and a wireless communication device for the feeder link. The service link wireless communication device and the feeder link wireless communication device are electrically connected to each other and exchange signals between the both wireless communication devices.

The relay device 13 performs beam forming in order to form cells 16a, 16b, . . . for the wireless communication device, and forms beam patterns directed toward the ground for the cells. In this specification, the cells 16a, 16b, . . . may be collectively referred to as a cell 16. In the example shown in FIG. 1, the number of cells is 4, but the number of cells and the size of the cells can be determined in view of the required communication area size, communication quality, communication capacity, and the like.

Figure 2A:
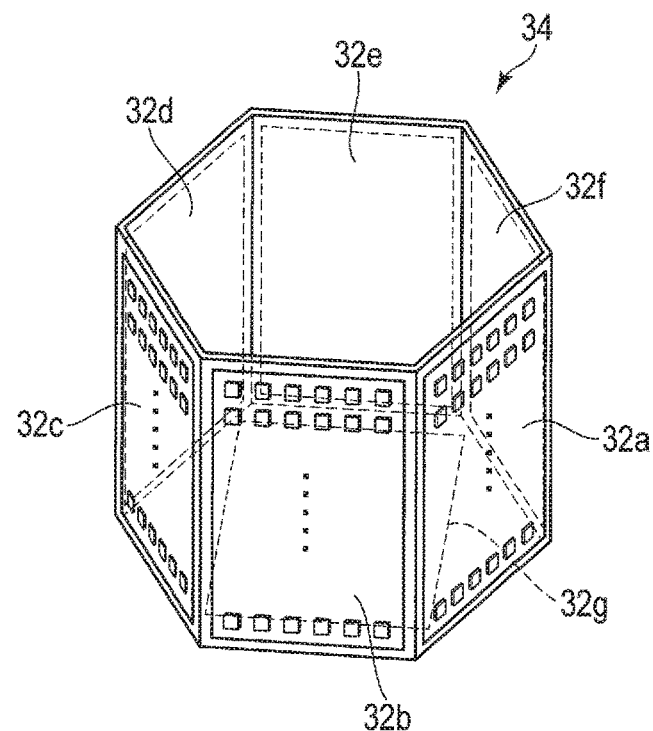
FIGS. 2A and 2B are diagrams showing an example of a service link antenna device.
Figure 2B:
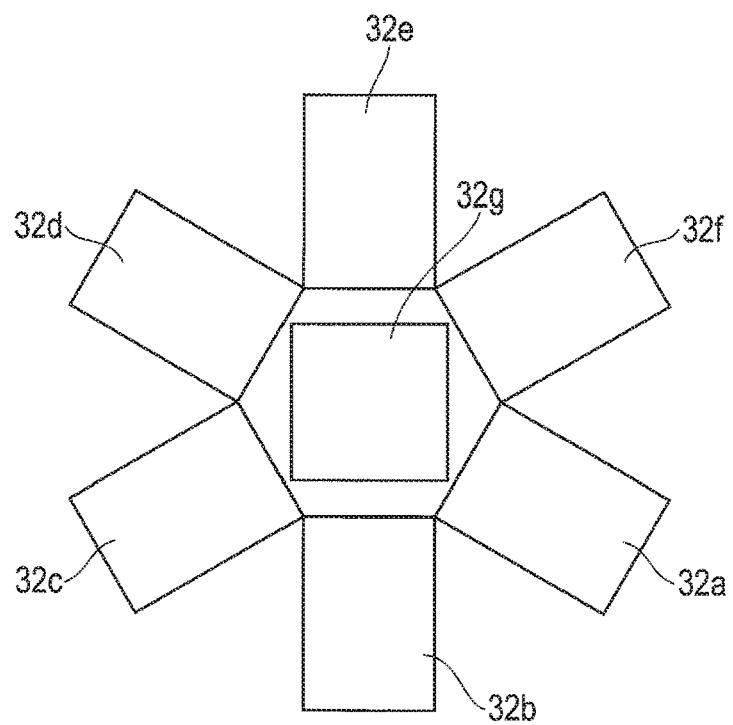

FIGS. 2A and 2B show an example of a service link antenna device 34. FIG. 2A is a perspective view of the antenna 34, and FIG. 2B shows a state in which the antenna 34 of FIG. 2A is developed on a plane.

The service link antenna device 34 is often desired to form beam patterns in a range of approximately 360 degrees. In that case, as shown in FIG. 2A, a plurality of array antennas (six antennas in this example) 32a to 32f are arranged respectively on the outer surfaces of side surfaces (six surfaces in this example) of the frame of an n-dimensional prism (n is a positive integer of three or greater, here a regular hexagonal prism) along a substantially vertical direction. When the regular hexagonal prism is used, the angle defined by two adjacent array antennas in the array antennas 32a to 32f is about 120 degrees. It is possible to determine the number of side surfaces of the polygon in view of the required communication area size, communication quality, communication capacity, and the like. The regular hexagonal prism may be along any direction other than the substantially vertical direction. The orientation of the regular hexagonal prism can also be determined in view of the required communication area size, communication quality, communication capacity, and the like. Furthermore, the shape of the frame may be an n-dimensional prism, and it is not limited to a regular n-dimensional prism.

Another array antenna 32g is arranged also on the regular hexagonal bottom surface (substantially horizontal surface) near the ground surface) of the frame of the regular hexagonal prism. The array antennas 32a to 32f include a rectangular substrate (hereinafter simply referred to as a substrate) and antenna elements arranged on the substrate in a two-dimensional array. The substrate includes a ground conductor and two dielectrics sandwiching the ground conductor. Square antenna elements composed of a conductor are arranged on the surface of the dielectric. In general, a size (length of one side of the square) W of the antenna element is $\lambda/(2\times\varepsilon^{1/2})$, but it may be slightly shifted. $\lambda$ is the wavelength of electromagnetic wave and is the reciprocal of the frequency of electromagnetic wave. $\varepsilon$ is the dielectric constant of the dielectric of the substrate that the antenna element is in contact with. In general, since $\varepsilon$ is 1 or more, the size W is shorter than a half wavelength. For example, when $\varepsilon$ is 4.0, the size W is a ¼ wavelength. In general, a distance D (distance (pitch) between the center of an element and the center of an element) between antenna elements is a half wavelength, but it may be slightly shifted.

In the example of FIGS. 2A and 2B, the shape of the substrate of the array antennas 32a to 32f is rectangular, but it may also be square. In the example of FIGS. 2A and 2B, the shape of the substrate of the array antenna 32g is square, but it may also be a regular hexagon. In this specification, the array antennas 32a to 32g may be collectively referred to as an array antenna 32.

Another array antenna 32 may be arranged on the regular hexagonal top surface (substantially horizontal surface far from the ground surface) of the frame of the regular hexagonal prism in addition to the bottom surface. The array antenna 32 may be arranged on only one of the bottom surface or the top surface. Alternately, no array antenna may be arranged on the bottom surface and the top surface. The installation of the array antenna 32 on the bottom surface and/or the top surface can also be determined in view of the required communication area size, communication quality, communication capacity, and the like.

FIGS. 3A and 3B show another example of a service link antenna device 36. FIG. 3A is a perspective view of the antenna 36, and FIG. 3B shows a state in which the antenna 36 of FIG. 3A is developed on a plane.

As shown in FIG. 3A, an n-dimensional pyramid (n is a positive integer 3 or greater, here a regular hexagonal pyramid) is along a substantially vertical direction with its apices being oriented towards the ground surface. A frame is composed of a root portion of the regular hexagonal pyramid where a tip portion is cut off. The six array antennas 32a to 32f are arranged respectively on the outer surfaces of the six side surfaces of the frame. That is, in the example of FIGS. 2A and 2B, the array antennas 32a to 32f are along the substantially vertical direction, and the beam patterns are irradiated in the horizontal direction, whereas in the example of FIGS. 3A and 3B, the array antennas 32a to 32f are inclined with respect to the vertical direction, and the beam patterns are irradiated slightly downwards. The inclination angle from the vertical direction can be determined in view of the positional relationship between the relay device 13 and the cells 16a, 16b, . . . , the required communication area size, communication quality, communication capacity, and the like. The inclination angle is an arbitrary angle greater than 0 degrees (vertical direction) and less than 90 degrees (horizontal direction). The service link antenna device 36 may have a shape in which FIG. 3A is turned upside down.

In the example of FIGS. 3A and 3B, the shape of the substrate of the array antennas 32a to 32f is rectangular, but it may also be square or trapezoidal. The array antenna 32g is also arranged on the bottom surface of the regular hexagon of the frame. In the example of FIGS. 3A and 3B, the shape of the substrate of the array antenna 32g is square, but it may also be a regular hexagon. Furthermore, the shape of the frame may be an n-dimensional pyramid, and it is not limited to a regular n-dimensional pyramid.

Similarly to the example of FIGS. 2A and 2B, also in the example of FIGS. 3A and 3B, the array antennas may be arranged on the top surface (substantially horizontal surface far from the ground surface) of the frame in addition to the bottom surface. The array antenna may be arranged on only one of the bottom surface or the top surface. Alternately, no array antenna may be arranged on the bottom surface and the top surface.

FIG. 4 shows an example of a feeder link antenna device 40. When forming beam patterns in the range of 360 degrees, the service link antenna device 34 is formed of array antennas covering the range of 360 degrees. However, in the case where there is only one base station device 14, the feeder link antenna device 40 that forms one beam pattern only in a specific direction may be formed of a single array antenna. In the embodiment, the feeder link antenna device 40 may be formed of a plurality of array antennas (three antennas in this example) 42a, 42b, and 42c. The array antennas 42a, 42b, and 42c have different orientations from one another so that the feeder link can be formed even if the balloon 12 rotates about the vertical axis. The angle defined by two adjacent array antennas in the array antennas 42a to 42c is an arbitrary angle greater than 90 degrees and less than 180 degrees. The angle defined by the array antennas 42a and 42b and the angle defined by the array antennas 42b and 42c may be equal or may be different. In this specification, the array antennas 42a to 42c may be collectively referred to as an array antenna 42. Similar to the array antenna 32, the array antenna 42 includes a substrate and square antenna elements arranged on the substrate in a two-dimensional array.

The inclination angle defined by the array antennas 42a and 42b and the inclination angles defined by the array antennas 42b and 42c may be equal or may be different. The arrangement direction of the array antenna 42 may be along the vertical direction or may be inclined. The arrangement of the array antenna 42 can be determined in view of the positional relationship between the relay device 13 and the base station device 14, and the required communication area size, communication quality, communication capacity, and the like. In the example of FIG. 4, the shape of the substrate of the array antenna 42 is rectangular, but it may also be square.

While the single array antenna 32 or 42 is formed on the single substrate, a single substrate may be divided into sub-substrates, a sub-array antenna may be formed on each of the sub-substrates, and the single array antenna 32 or 42 may be formed of the sub-array antennas.

FIGS. 5A and 5B show another example of the feeder link antenna device. The example of FIGS. 5A and 5B shows the feeder link antenna device that forms feeder link beam patterns in the range of 360 degrees similarly to the service link antenna device 34 or 36. Similarly to the service link antenna device 34 shown in FIGS. 2A and 2B, a feeder link antenna device 41 shown in FIG. 5A includes the three array antennas 42a to 42c. The three array antennas 42a to 42c are arranged respectively on the outer surfaces of three side surfaces of the frame of the n-dimensional prism (here n=3). Similarly to the service link antenna device 36 shown in FIGS. 3A and 3B, a feeder link antenna device 43 shown in FIG. 5B includes the three array antennas 42a to 42c. The three array antennas 42a to 42c are arranged respectively on the outer surfaces of the three side surfaces of the frame of the n-dimensional pyramid (here n=3).

Also in FIGS. 5A and 5B, it is possible to determine the number "n" in view of the required communication area size, communication quality, communication capacity, and the like. The shape of the substrate of the array antennas 42a to 42c is rectangular, but it may also be square. In view of the required communication area size, communication quality, communication capacity, and the like, another array antenna 42 may also be arranged also on the bottom surface or the top surface. Note that the antenna 43 of FIG. 5B may be turned upside down.

Figure 6A:
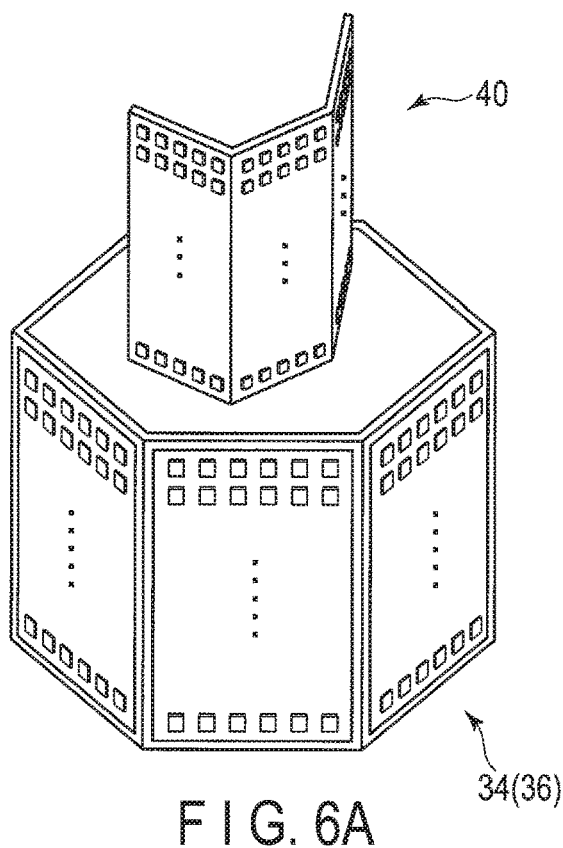
FIGS. 6A and 6B are diagrams showing an example of arrangement of the service link antenna device and the feeder link antenna device.
Figure 6B:
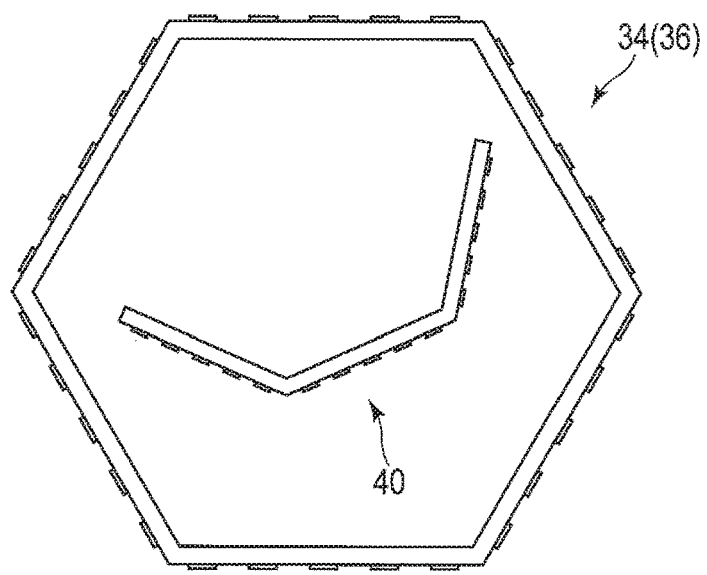

FIGS. 6A and 6B show an example of the arrangement relationship between the service link antenna device 34 or 36 and the feeder link antenna device 40 (or 41 or 43). FIG. 6A is a perspective view, and FIG. 6B is a plan view of FIG. 6A as viewed from above. When the relay device 13 is above the cell 16, the service link antenna device 34 or 36 forms downward beam patterns, and thus the feeder link antenna device 40 (or 41 or 43) is arranged on the top surface of the service link antenna device 34 or 36. In this case, in the service link antenna device 34 or 36, the array antenna is not arranged on the top surface but the array antenna is arranged on the bottom surface.

Depending on the positional relationship between the cell 16 and the relay device 13, the feeder link antenna device 40 (or 41 or 43) may be arranged on the bottom surface of the service link antenna device 34 or 36. Furthermore, the service link antenna device 34 or 36 and the feeder link antenna device 40 (or 41 or 43) may be arranged at substantially the same height.

As shown in FIGS. 2A and 2B and FIGS. 3A and 3B, the substrates of two adjacent array antennas in the array antennas 32 forming the service link antenna device 34 or 36 have different orientations from each other. As shown in FIG. 4, the substrates of the array antennas 42 forming the feeder link antenna device 40 (or 41 or 43) have different orientations from one another. As shown in FIG. 6B, the respective substrates of the array antennas forming the service link antenna device 34 or 36 have different orientations from the substrates of the array antennas forming the feeder link antenna device 40 (or 41 or 43). The respective substrates of the array antennas forming the feeder link antenna device 40 (or 41 or 43) have different orientations from the substrates of the array antennas forming the service link antenna device 34 or 36.

By changing the orientation of the array antennas in this manner, it is possible to avoid the heat dissipation action caused by the convection of air from the service link antenna device 34 or 36 and the heat dissipation action caused by the convection of air from the feeder link antenna device 40 (or 41 or 43) from simultaneously deteriorating. Therefore, it is possible to enhance the heat dissipation efficiency as the entire wireless communication device.

The configuration example of the service link antenna device 34 or 36 and the feeder link antenna device 40, 41, or 43 is not limited to the above description. In the above description, the service link antenna device 34 or 36 is formed by arranging the array antennas on the side surfaces of the frame of the n-dimensional prism or the n-dimensional pyramid. Another array antenna is also arranged on the bottom surface and/or the top surface of the frame of the n-dimensional prism or the n-dimensional pyramid as necessary. The feeder link antenna device 40, 41, or 43 is formed by arranging the array antennas so that their substrates have different orientations. However, the service link antenna devices and the feeder link antenna devices may be reversed. That is, the feeder link antenna device 40, 41, or 43 may be formed by arranging the array antennas on the side surfaces of the frame of the n-dimensional prism or the n-dimensional pyramid. Another array antenna is also arranged on the bottom surface and/or the top surface of the frame of the n-dimensional prism or the n-dimensional pyramid as necessary. The service link antenna device 34 or 36 may be formed by arranging the array antennas so that their substrates have different orientations from one another.

Note that an antenna that are not arranged on the frame of the n-dimensional prism or the n-dimensional pyramid may be formed of array antennas other than the array antennas in which the substrates have different orientations from one another. For example, both the service link antenna device and the feeder link antenna device may be formed by arranging the array antennas on the side surfaces of the frame of the n-dimensional prism or the n-dimensional pyramid. Another array antenna may also be arranged on the bottom surface and/or the top surface of the frame as necessary.

FIGS. 7A and 7B show an example of the arrangement relationship between the service link antenna device 34 or 36 and a feeder link antenna device 44. FIG. 7A is a perspective view, and FIG. 7B is a cross-sectional view of FIG. 7A as viewed from the side. The frame of the hexagonal prism or the hexagonal pyramid of the service link antenna device 34 or 36 shown in FIGS. 2A and 2B or FIGS. 3A and 3B is extended downwards. When extended, the inclination angle of the side surfaces with respect to the vertical direction is slightly increased, and the side surfaces are slightly brought closer to the horizontal direction. Array antennas 42a to 42f constituting the feeder link antenna device 44 are arranged respectively on the outer side surfaces of the frame of the extended portion. Therefore, any of the substrates of the array antennas 32a to 32f constituting the service link antenna device 34 or 36 has a different orientation from any of the substrates of the array antennas 42a to 42f constituting the feeder link antenna device 44. The array antenna 32g of the service link antenna device 34 or 36 is arranged on the outer bottom surface of the frame of the extended portion.

FIGS. 8A and 8B show an example of the arrangement relationship between the service link antenna device 34 or 36 and a feeder link antenna device 46. FIG. 8A is a perspective view, and FIG. 8B is a cross-sectional view of FIG. 8A as viewed from the side. The frame of the hexagonal prism or the hexagonal pyramid of the service link antenna device 34 or 36 shown in FIGS. 2A and 2B or FIGS. 3A and 3B is extended upwards. When extended, the inclination angle of the side surface with respect to the vertical direction is slightly increased, and the side surfaces are slightly brought closer to the horizontal direction. The array antennas 42a to 42f constituting the feeder link antenna device 46 are arranged respectively on the outer side surfaces of the frame of the extended portion. The array antenna 32g constituting the service link antenna device 34 or 36 is arranged on the outer bottom surface of the frame. Therefore, any of the substrates of the array antennas 32a to 32f constituting the service link antenna device 34 or 36 has a different orientation from any of the substrates of the array antennas 42a to 42f constituting the feeder link antenna device 46.

Furthermore, while the service link antenna device and the feeder link antenna device are achieved by the separate antennas devices in the above description, the service link antenna device 34 shown in FIGS. 2A and 2B or the service link antenna device 36 shown in FIGS. 3A and 3B may be shared by the service link antenna device and the feeder link antenna device. Alternately, the feeder link antenna device 40 shown in FIG. 4, the feeder link antenna device 41 shown in FIG. 5A, or the feeder link antenna device 43 shown in FIG. 5B may be shared by the service link antenna device and the feeder link antenna device.

Furthermore, while both the service link antenna device and the feeder link antenna device are formed of the array antennas, at least one of the service link antenna device or the feeder link antenna device may be formed of a single array antenna.

FIG. 9 is a block diagram showing an example of the relay device 13. The array antennas 42a to 42c constituting the feeder link antenna device 40, 41, 43, 44, or 46 are connected to first wireless communication devices 54a to 54c, respectively. In this specification, the first wireless communication devices 54a to 54c may be collectively referred to as a first wireless communication device 54. The array antennas 32a to 32g constituting the service link antenna device 34 or 36 are connected to second wireless communication devices 52a to 52g, respectively. In this specification, the second wireless communication devices 52a to 52g may be collectively referred to as a second wireless communication device 52.

The first wireless communication device 54 and the second wireless communication device 52 require different electromagnetic wave powers. An electromagnetic wave power required for the second wireless communication device 52 is set larger than an electromagnetic wave power required for the first wireless communication device 54. For this reason, the second wireless communication device 52 generates more heat than the first wireless communication device 54. The electromagnetic wave power may be the maximum transmission power that each wireless communication device can transmit, a set value of transmission power assumed in normal use, or an estimated value of an average value of transmission power assumed in actual use.

The first wireless communication device 54 and the second wireless communication device 52 are connected to each other via a repeater 56. A signal received by any of the first wireless communication devices 54a to 54c is input to any of the second wireless communication devices 52a to 52g via the repeater 56. The signal from the first wireless communication device 54 to the repeater 56 may be a signal before demodulation in the first wireless communication device 54 or a signal after demodulation. Similarly, a signal received by any of the second wireless communication devices 52a to 52g is input to any of the first wireless communication devices 54a to 54c via the repeater 56. The signal from the second wireless communication device 52 to the repeater 56 may be a signal before demodulation in the second wireless communication device 52 or a signal after demodulation. Thus, the signal received by one of the first wireless communication device 54 or the second wireless communication device 52 is transmitted from the other of the first wireless communication device 54 and the second wireless communication device 52.

Thus, the first wireless communication device 54 and the second wireless communication device 52 are physically connected to each other via a signal transmission conductor. Therefore, heat can be conducted between the first wireless communication device 54 and the second wireless communication device 52 via the signal transmission conductor, and heat generated by the second wireless communication device is conducted to the first wireless communication device.

Furthermore, the first wireless communication device 54, the second wireless communication device 52, and the repeater 56 are grounded. Specifically, the first wireless communication device 54, the second wireless communication device 52, and the repeater 56 are connected to a grounding conductor. That is, the first wireless communication device 54 and the second wireless communication device 52 are physically connected to each other via the grounding conductor. For this reason, heat can be conducted between the first wireless communication device 54 and the second wireless communication device 52 even via the grounding conductor. Heat generated by the second wireless communication device is conducted to the first wireless communication device.

Furthermore, since the first wireless communication device 54 and the second wireless communication device 52a are mounted on the single balloon 12, heat can be conducted between the first wireless communication device 54 and the second wireless communication device 52, and heat generated by the second wireless communication device 52 is conducted to the first wireless communication device 54.

As described above, the heat generated by the second wireless communication device 52 is conducted to the first wireless communication device 54, and the heat generated by the second wireless communication device 52 affects the entire relay device 13. By making the heat dissipation amount of the second wireless communication device 52 larger than the heat dissipation amount of the first wireless communication device 54, it is possible to cause the relay device 13 to efficiently dissipate heat.

In order not to cause radio interference, the frequency band of electromagnetic wave transmitted and received by the first wireless communication device 54 and the frequency band of electromagnetic wave transmitted and received by the second wireless communication device 52 are set to be different from each other. Here, the frequency band of electromagnetic wave transmitted and received by the second wireless communication device 52 is set lower than the frequency band of electromagnetic wave transmitted and received by the first wireless communication device 54. The higher the frequency is, the larger the heat generation amount of the wireless communication device is. By making the frequency band of the second wireless communication device 52, which has a large electromagnetic wave power and a large heat generation amount, lower than the frequency band of the first wireless communication device 54, the heat generation amount of the second wireless communication device 52 can be reduced. For this reason, it is possible to cause the relay device 13 to efficiently dissipate heat.

In FIG. 9, both the feeder link antenna device 40, 41, 43, 44, or 46 and the service link antenna device 34 or 36 are formed of the array antennas. Hence, the wireless communication devices 54 and 52 are provided in accordance with the number of the array antennas. However, as mentioned above, the number of corresponding wireless communication devices becomes singular in a case where at least one of the feeder link antenna device 40, 41, 43, 44, or 46 and the service link antenna device 34 or 36 is formed of a single array antenna.

FIG. 10 is a block diagram of an example of the first wireless communication device 54 and the second wireless communication device 52. As described above, the first wireless communication device 54 and the second wireless communication device 52 have the same basic configuration, although they are different in an electromagnetic wave power and a frequency. A single wireless communication device is connected to a single array antenna. The wireless communication device may include a single baseband processing unit (referred to as a BB unit) 62 and radio processing units (referred to as RF units) 64-1, 64-2, . . . . In this specification, the RF units 64-1, 64-2, . . . may be collectively referred to as an RF unit 64. The BB unit 62 is a digital processing circuit, and signal processing is performed by a processor or an FPGA (Field Programmable Gate Array). The BB unit 62 is connected to the repeater 56. Although not illustrated, not the BB unit 62 but the RF unit 64 may be connected to the repeater 56.

The BB unit 62 includes a transmission unit and a reception unit. The transmission unit includes a modulator 72 that modulates transmission data, and a D/A converter (referred to as a DAC) 74 that performs D/A conversion of output data of the modulator 72. The DAC 74 supplies the converted analog transmission signal to the RF units 64-1, 64-2, . . . . A reception unit of the BB unit 62 includes an A/D converter (referred to as an ADC) 96 that performs A/D conversion of analog reception signals from the RF units 64-1, 64-2, . . . , and a demodulator 98 that demodulates output data of the ADC 96.

The RF units 64-1, 64-2, . . . are connected via selectors 66-1, 66-2, . . . to antenna elements 68-1, 68-2, respectively. The antenna elements 68-1, 68-2 forms the array antenna 32 or 42. In this specification, the antenna elements 68-1, 68-2, . . . may be collectively referred to as an antenna element 68. The selectors 66-1, 66-2, . . . may be collectively referred to as a selector 66. The transmission signal from the BB unit 62 is input to a filter 76. The transmission signal passed through the filter 76 is converted to a radio frequency signal (RF signal) by an up-converter 78. The RF signal from the up-converter 78 is input to a phase shifter 80, and its phase is shifted. The RF signal from the phase shifter 80 is input to an amplifier 82, and its amplitude is adjusted. The RF signal from the amplifier 82 is input to a first terminal of the selector 66 as an output of the RF unit 64.

The RF signal input to the first terminal of the selector 66 is irradiated from the antenna element 68 as an electromagnetic wave. The phase shift amount of the phase shifter 80 and the amplification factor of the amplifier 82 are controlled by a beam forming control unit 69. By adjusting the phase shift amount of the phase shifter 80 and the amplification factor of the amplifier 82, the electromagnetic wave to be irradiated from the array antenna 32 or 42 can be formed into a beam pattern (beam forming) having directivity in a specific direction.

The RF signal received by the array antenna 32 or 42 is output from a second terminal of the selector 66 and input to an amplifier 88, and thus its amplitude is adjusted. The amplification factor of the amplifier 88 corresponds to the amplification factor of the amplifier 82. The RF signal from the amplifier 88 is input to a phase shifter 90, and its phase is shifted. The phase shift amount of the phase shifter 90 also corresponds to the phase shift amount of the phase shifter 80. The phase shift amount of the phase shifter 90 and the amplification factor of the amplifier 88 are also controlled by the beam forming control unit 69. By adjusting the phase shift amount of the phase shifter 90 and the amplification factor of the amplifier 88, the electromagnetic wave received by the array antenna 32 or 42 can be formed into a beam pattern having directivity in a specific direction.

The RF signal from the phase shifter 90 is input to a down-converter 92 and converted to the frequency of the baseband signal. The baseband signal from the down-converter 92 is input to the BB unit 62 as an output of the RF unit 64 via a filter 94.

In the wireless communication device of FIG. 10, the baseband signal from the BB unit 62 of the wireless communication device of the reception side is input to the BB unit 62 of the wireless communication device of the transmission side via the repeater 56. However, instead of this, the baseband signal from the RF unit 64 of the wireless communication device of the reception side may be input to the RF unit 64 of the wireless communication device of the transmission side via the repeater 56. Furthermore, instead of relaying the baseband signal, the RF signal may also be relayed. For example, the RF signal from the phase shifter 90 in the RF unit 64 of the wireless communication device of the reception side may be input to the phase shifter 80 in the RF unit 64 of the wireless communication device of the transmission side via the repeater 56.

The radio frequency of the up-converter 78 and the down-converter 92 of the first wireless communication device 54 is set higher than the radio frequency of the up-converter 78 and the down-converter 92 of the second wireless communication device 52. The power of the amplifiers 82 and 88 of the second wireless communication device 52 is set larger than the power of the amplifiers 82 and 88 of the first wireless communication device 54.

FIG. 11 is a block diagram of another example of the first wireless communication device 54 and the second wireless communication device 52. In the example of FIG. 10, the phase shifter 80 is connected between the amplifier 82 and the up-converter 78 and the phase shifter 90 is connected between the amplifier 88 and the down-converter 92 in the RF unit 64. However, in the example of FIG. 11, the RF unit 64 does not include the phase shifters 80 and 90. The output of the up-converter 78 in the RF unit 64 is input to the amplifier 82. The output of the amplifier 88 is input to the down-converter 92. The BB units 62-1, 62-2, . . . are connected to the RF units 64-1, 64-2, . . . , respectively. In this specification, the BB units 62-1, 62-2, . . . may be collectively referred to as the BB unit 62. The transmission unit of the BB unit 62 includes a weight multiplication processor 73 and the DAC 74. The reception unit of the BB unit 62 includes the ADC 96 and a weight multiplication processor 97. A control signal from the beam forming control unit 69 is supplied to the BB unit 62. The weight multiplication processors 73 and 97 digitally adjust the amplitude and phase of the signal in accordance with the control signal from the beam forming control unit 69. Thus, the beam forming processing is digitally executed.

A modulator/demodulator 60 including the modulator 72 and the demodulator 98 is connected to the BB units 62-1, 62-2, . . .

FIG. 12 is a block diagram of yet another example of the first wireless communication device 54 and the second wireless communication device 52. In the example shown in FIG. 10, the RF unit 64 is provided for each antenna element 68. However, the RF unit 64 may be divided into two parts and one part may be provided for each antenna element 68. For example, as shown in FIG. 12, first RF units 64*a*-1, 64*a*-2, . . . may be formed of the amplifiers 82 and 88 and the phase shifters 80 and 90, and a second RF unit 64*b* may be formed of the filters 76 and 94, the up-converter 78, and the down-converter 92. In this specification, the first RF units 64*a*-1, 64*a*-2, . . . may be collectively referred to as a first RF unit 64*a*.

The first RF units 64*a* are respectively provided for the antenna elements 68, and the single second RF unit 64*b* is provided for the wireless communication device similarly to the BB unit 62. The second RF unit 64*b* is connected to the BB unit 62. The RF signal from the second RF unit 64*b* is input to the first RF unit 64*a*. The RF signal from the first RF unit 64*a* is input to the second RF unit 64*b*.

Figure 13:
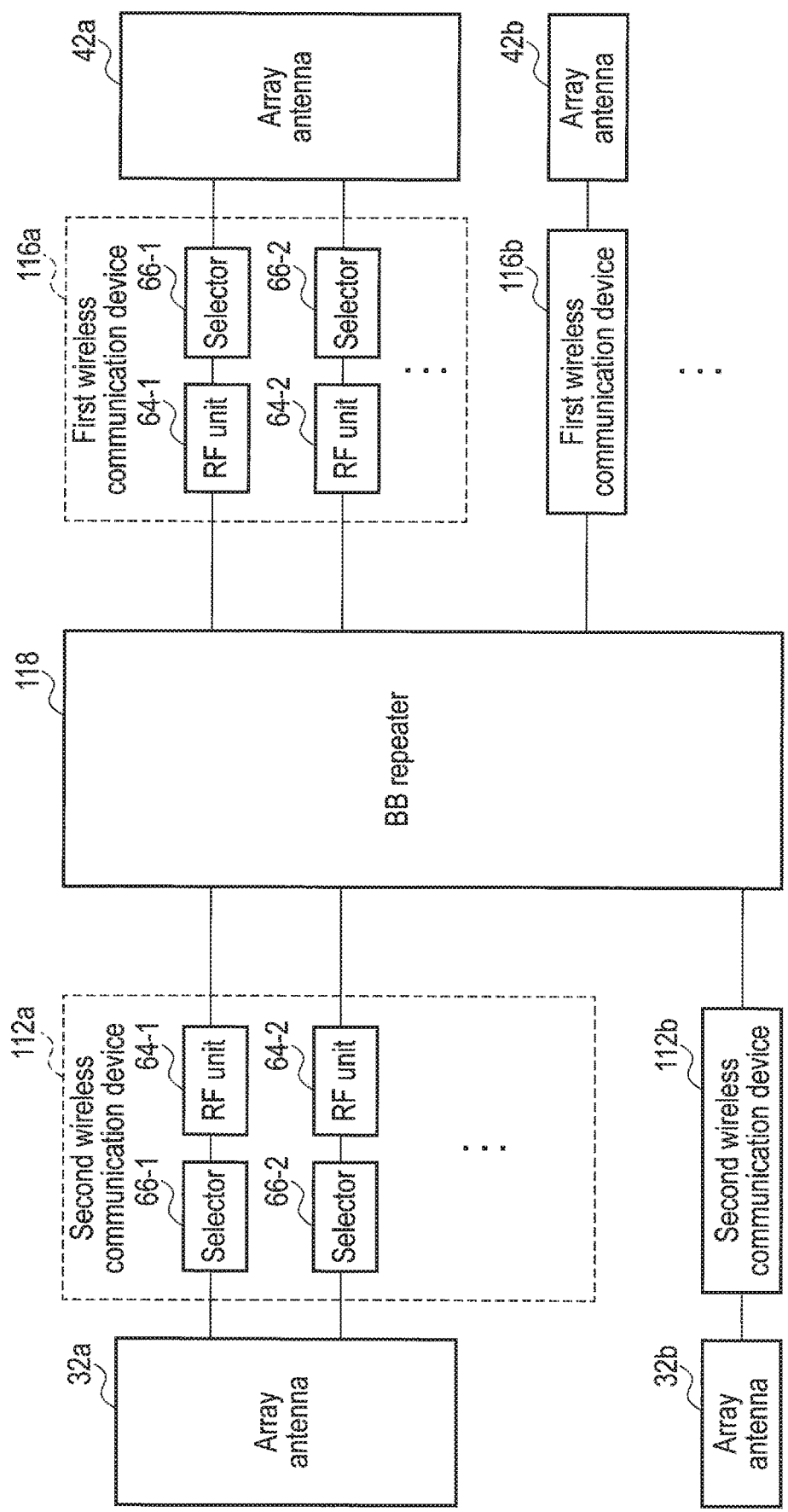
FIG. 13 is a block diagram showing still another example of the wireless communication device.

FIG. 13 is a block diagram of yet another example of the first wireless communication device 54 and the second wireless communication device 52. In the examples shown in FIGS. 10 to 12, the single repeater 56 is provided for the relay device 13, and the BB units 62 are provided for the wireless communication devices 52 and 54, respectively. In the example of FIG. 13, a single BB repeater 118 formed of the processor or the FPGA is provided for the wireless communication devices 52 and 54. First wireless communication devices 116*a*, 116*b*, . . . and second wireless communication devices 112*a*, 112*b*, . . . are connected to the BB repeater 118. In this specification, the first wireless communication devices 116*a*, 116*b*, . . . may be collectively referred to as a first wireless communication device 116. The second wireless communication devices 112a, 112b, ... may be collectively referred to as a second wireless communication device 112.

The BB repeater 118 is an integration of the BB unit 62 and the repeater 56 of FIG. 10. The first wireless communication device 116 and the second wireless communication device 112 include the selector 66 and the RF unit 64 of FIG. 10. Alternatively, the BB repeater 118 is an integration of the second RF unit 64b, the BB unit 62, and the repeater 56 of FIG. 12. The first wireless communication device 116 and the second wireless communication device 112 may include the selector 66 and the first RF unit 64a of FIG. 12.

The BB repeater 118 of FIG. 13 may be divided into several sub-BB repeaters, and the several sub-BB repeaters 118 may be provided for first wireless communication devices 116 and second wireless communication devices 112.

In this manner, the processor or the FPGA performing part of functions of the first wireless communication device 54 and the processor or the FPGA performing part of functions of the second wireless communication device 52 are shared. Therefore, heat can be conducted between the first wireless communication device 54 and the second wireless communication device 52 via the shared device. Heat generated by the second wireless communication device 52 is conducted to the first wireless communication device 54. Not only the digital circuit units for the first wireless communication device 54 and the second wireless communication device 52, or in addition to the digital circuit units, but the analog circuit units such as the RF units for the first wireless communication device 54 and the second wireless communication device 52 may also be implemented on a common substrate. In this case, the first wireless communication device 116 and the second wireless communication device 112 are physically connected to each other via the common substrate. Heat generated by the second wireless communication device 112 is conducted to the first wireless communication device 116.

Another means for making the heat dissipation amount of the second wireless communication device 52 larger than the heat dissipation amount of the first wireless communication device 54 will be described.

Figure 14A:
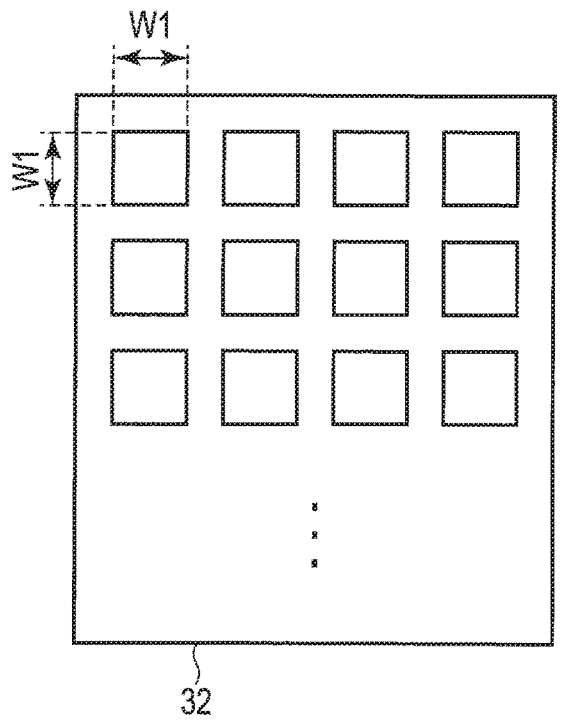
FIGS. 14A and 14B are diagrams showing an example of arrangement of antenna elements of the service link antenna device and the feeder link antenna device.
Figure 14B:
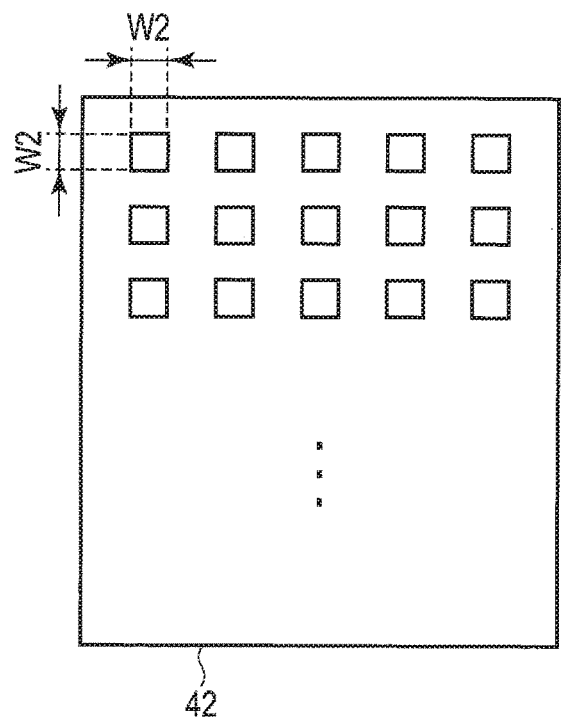

FIGS. 14A and 14B show an example of the array antennas of the service link antenna device 34 or 36 and the feeder link antenna device 40, 41, 43, 44, or 46. FIG. 14A is a front view of the array antenna 32 forming the service link antenna device 34 or 36. FIG. 14B is a front view of the array antenna 42 forming the feeder link antenna device 40, 41, 43, 44, or 46.

As shown in FIGS. 14A and 14B, the antenna elements of the service link array antenna and the feeder link array antenna are different in size. A size (length of one side of the square) W1 of each antenna element of the service link array antenna 32 is larger than a size W2 of each antenna element of the feeder link array antenna 42. Since the antenna element of the array antenna is a conductor, it also acts as a heat sink. A part of the array antenna where the antenna elements are arranged has good heat dissipation efficiency. However, a part of the array antenna where the antenna elements are not arranged has poor heat dissipation efficiency because the substrate is a dielectric. The larger the total area of the antenna elements, the better the heat dissipation efficiency is. If the antenna element size of the service link array antenna 32 is larger than that of the feeder link array antenna 42, the total antenna element area also becomes larger, and the service link array antenna 32 dissipates more heat than the feeder link array antenna 42.

Therefore, by increasing the size W1 of the antenna element of the service link array antenna 32 to cause more heat to be dissipated from the service link array antenna 32, it is possible to reduce the heat generation amount of the second wireless communication device 52. The second wireless communication device 52 has a large power and a large heat generation amount. Therefore, it is possible to cause the relay device 13 to efficiently dissipate heat.

Figure 15A:
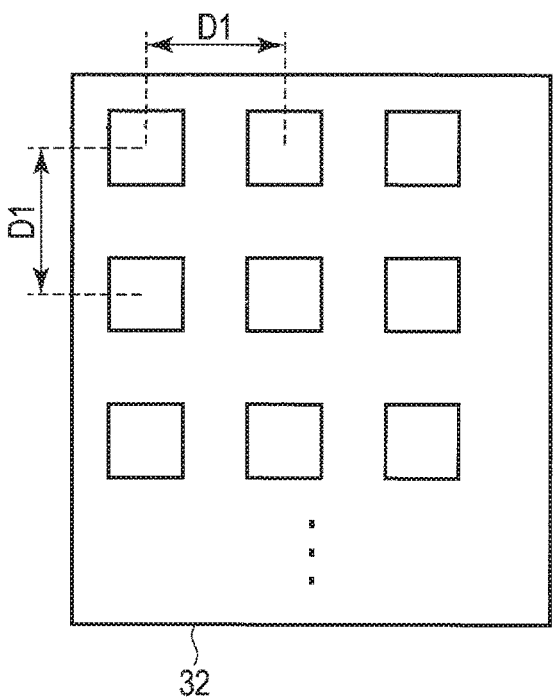
FIGS. 15A and 15B are diagrams showing another example of arrangement of the antenna elements of the service link antenna device and the feeder link antenna device.
Figure 15B:
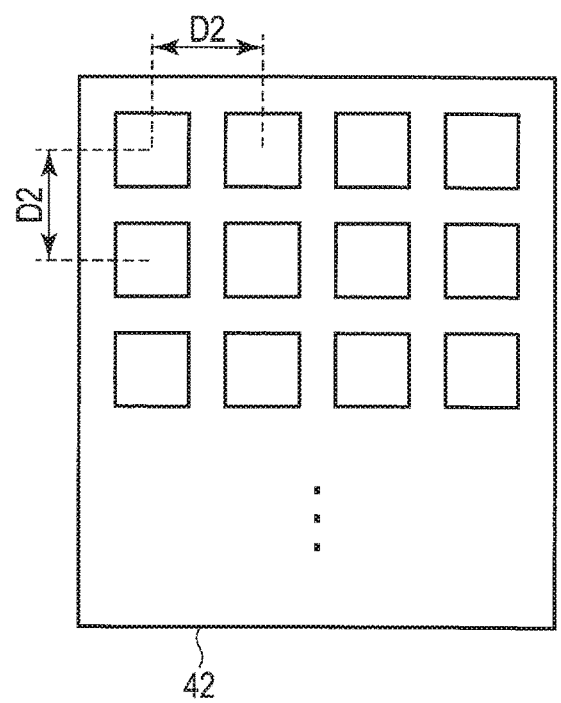

FIGS. 15A and 15B show another example of the array antennas of the service link antenna device and the feeder link antenna device. FIG. 15A is a front view of the array antenna 32 forming the service link antenna device 34 or 36. FIG. 15B is a front view of the array antenna 42 forming the feeder link antenna device 40, 41, 43, 44, or 46.

As shown in FIGS. 15A and 15B, the service link array antenna and the feeder link array antenna have the antenna elements of the same size and different distances (distance between the center of the antenna element and the center of the adjacent antenna element) between antenna elements. A distance D1 between the antenna elements of the service link array antenna 32 is longer than a distance D2 between the feeder link array antennas 42. Assuming that the total area of the antenna elements is the same, the longer the distance between the elements is, the wider range the antenna elements are distributed, and hence the heat dissipation efficiency is improved. Therefore, the service link array antenna 32 dissipates more heat than the feeder link array antenna 42. As a result, it is possible to reduce the heat generation amount of the second wireless communication device 52, which has a large power and a large heat generation amount, and to cause the relay device 13 to efficiently dissipate heat.

Figure 16A:
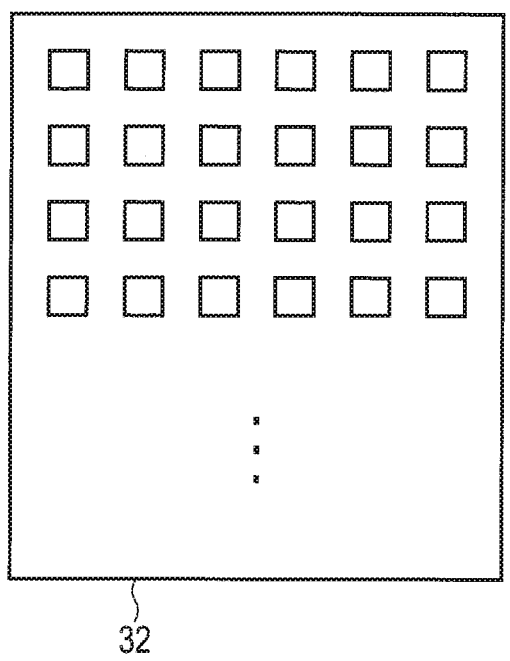
FIGS. 16A and 16B are diagrams showing yet another example of arrangement of the antenna elements of the service link antenna device and the feeder link antenna device.
Figure 16B:
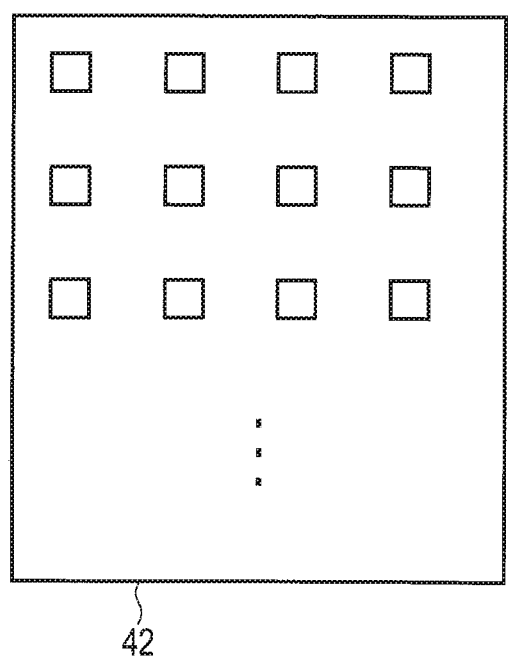

FIGS. 16A and 16B show yet another example of the array antennas of the service link antenna device and the feeder link antenna device. FIG. 16A is a front view of the array antenna 32 forming the service link antenna device 34 or 36. FIG. 16B is a front view of the array antenna 42 forming the feeder link antenna device 40, 41, 43, 44, or 46.

As shown in FIGS. 16A and 16B, the service link array antenna 32 and the feeder link array antenna 42 are different in the number of antenna elements. The number of antenna elements of the service link array antenna 32 is larger than the number of antenna elements of the feeder link array antenna 42. Assuming that the antenna element area of the service link array antenna 32 and the antenna element area of the feeder link array antenna 42 are the same, the more the number of elements is, the larger the total area of the antenna elements is. Also by this, the service link array antenna 32 dissipates more heat than the feeder link array antenna 42. As a result, it is possible to enhance the heat dissipation efficiency of the second wireless communication device 52, which has a large power and a large heat generation amount, and to cause the entire relay device 13 to efficiently dissipate heat.

FIGS. 17A and 17B show yet another example of the array antennas of the service link antenna device and the feeder link antenna device. FIG. 17A is a plan view of the service link array antenna 32 and the feeder link array antenna 42 as viewed from above. FIG. 17A shows the array antennas 32a and 42a as examples. Other array antennas 32b to 32f, 42b, and 42c are arranged in the same manner.

The service link array antenna 32a includes sub-array antennas 32a-1, 32a-2, 32a-3, and 32a-4 formed on not a single substrate but substrates. The orientations of the substrates of the sub-array antennas 32a-1 to 32a-4 are different from one another, and are different from the orientation of the substrate of the feeder link array antenna 42a. Therefore, it is prevented that the heat dissipation action by the convection of air from the service link array antenna 32 and the heat dissipation action by the convection of air from the feeder link array antenna 42 are simultaneously deteriorated, It is possible to enhance the heat dissipation efficiency of the entire relay device 13.

As shown in FIG. 17B, the sub-array antennas 32*a*-1, 32*a*-2, 32*a*-3, and 32*a*-4 are connected to a BB unit 55 via RF units 53-1, 53-2, 53-3, and 53-4, respectively. The RF units 53-1, 53-2, 53-3, and 53-4 and the BB unit 55 form the second wireless communication device 52*a*. In FIG. 17B, selectors between the array antennas 32*a*-1, 32*a*-2, 32*a*-3, and 32*a*-4 and the RF units 53-1, 53-2, 53-3, and 53-4 are not illustrated.

Figure 18:
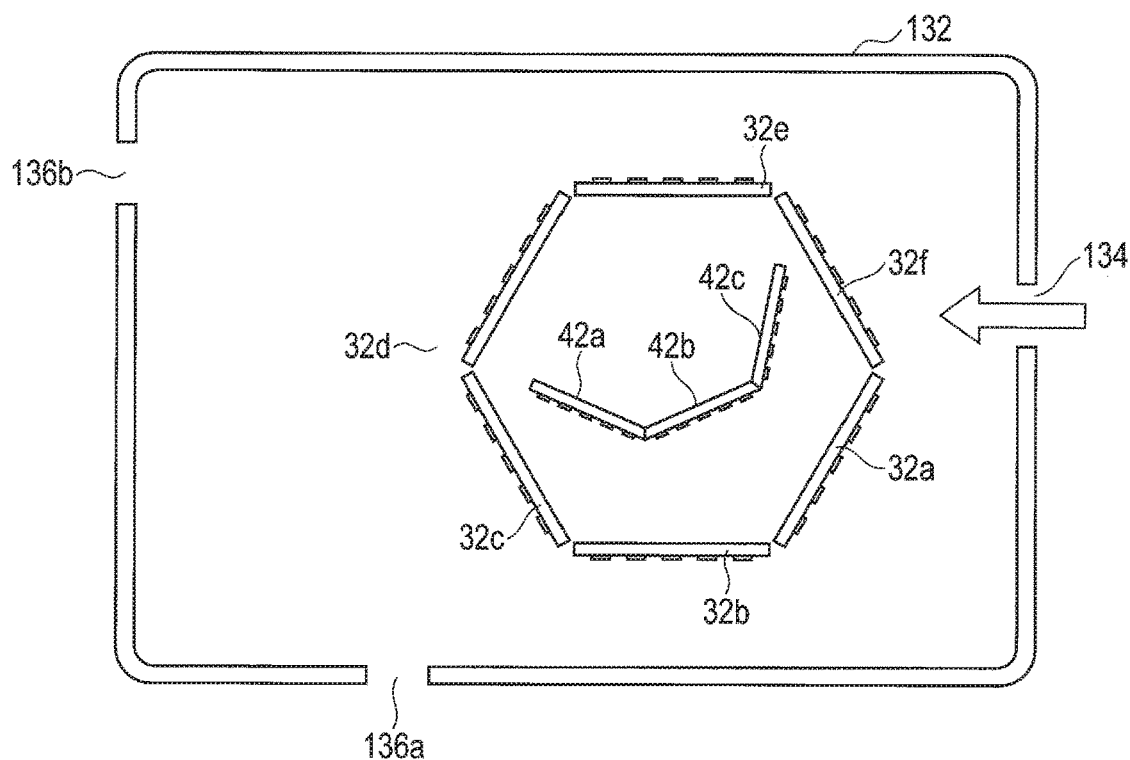
FIG. 18 is a diagram showing another example of arrangement of the service link antenna device and the feeder link antenna device.

As shown in FIG. 18, the service link antenna device 34 or 36 and the feeder link antenna device 40, 41, 43, 44, or 46 may be mounted on the balloon 12 in a state of being arranged in a housing 132. Since the convection of air occurs in the balloon 12, the housing 132 is provided with an air inlet 134 and air outlets 136*a* and 136*b*, and the service link array antennas 32 are arranged in orientations different from the flow direction of air flowing into the housing 132 through the air inlet 134. Thus, the heat dissipation efficiency of the service link antenna device 34 or 36 can be enhanced. If at least one of the service link array antennas is orthogonal to the flow direction of air flowing into the housing 132 through the air inlet 134, there is a possibility that the airflow is blocked by the array antenna and the heat dissipation efficiency is lowered. Hence, all the service link array antennas may be arranged in orientations other than the orientation orthogonal to the flow direction of the air flowing into the housing 132 through the air inlet 134.

Figure 19:
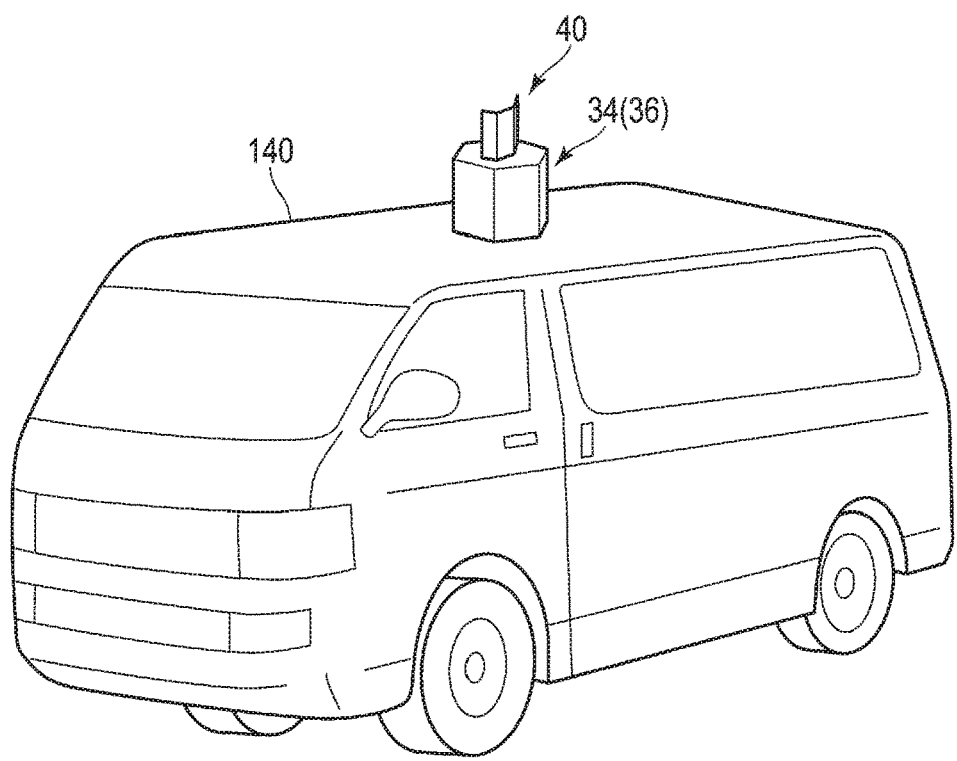
FIG. 19 is a diagram showing yet another example of arrangement of the service link antenna device and the feeder link antenna device.

When the service link antenna device 34 or 36 of the relay device 13 and the feeder link antenna device 40 are mounted on an automobile 140 as shown in FIG. 19, or a flying object (including balloons), an flow air can be generated by the movement of the automobile 140 or the flying object. The efficiency of heat dissipation of the antennas 34 or 36 and 40 can be enhanced. In this case, the air flows in a direction opposite to the main direction of the movement. Hence, the array antennas constituting the service link antenna device 34 or 36 are arranged in orientations different from this direction. Thus, the heat dissipation efficiency of the service link antenna device 34 or 36 can be enhanced. If at least one of the service link array antennas is orthogonal to the flow direction of air, there is a possibility that the airflow is blocked by the array antenna and the heat dissipation efficiency is lowered. Hence, all the service link array antennas may be arranged in orientations other than the orientation orthogonal to the flow direction of the air.

FIGS. 18 and 19 show the example shown in FIGS. 6A and 6B as an example of the antenna, but the antenna shown in FIGS. 7A and 7B and FIGS. 8A and 8B can be similarly applied to the examples shown in FIGS. 18 and 19.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a first array antenna comprising a plurality of first antenna elements on a first planar substrate;
    a first wireless communication device that communicates via a first frequency band by the first array antenna;
    a second array antenna comprising a plurality of second antenna elements on a second planar substrate, an orientation of the second planar substrate being different from an orientation of the first planar substrate; and
    a second wireless communication device that communicates via a second frequency band by the second array antenna, wherein
    the second frequency band is lower than the first frequency band,
    power of an electromagnetic wave transmitted by the second wireless communication device is larger than power of an electromagnetic wave transmitted by the first wireless communication device, and
    a size of the plurality of second antenna elements or a distance of the plurality of second antenna elements is larger than a size of the plurality of first antenna elements or a distance of the plurality of the first antenna elements.

2. The electronic device of claim 1, wherein a number of the plurality of the second antenna elements is larger than a number of the plurality of the first antenna elements.

3. The electronic device of claim 1, wherein
    the plurality of the second antenna elements are arranged on a plurality of planar substrate portions, and
    an orientation of one of the plurality of planar substrate portions is different from orientations of others of the planar substrate portions.

4. The electronic device of claim 1, wherein
    the first wireless communication device and the second wireless communication device are movable, and
    an orientation of at least one of the first planar substrate or the second planar substrate is different from a main movement direction of the first wireless communication device and the second wireless communication device.

5. The electronic device of claim 1, wherein at least one of the first wireless communication device or the second wireless communication device comprises sub-devices.

6. The electronic device of claim 1, wherein at least part of the first wireless communication device is physically connected to at least a part of the second wireless communication device.

7. The electronic device of claim 6, wherein the first wireless communication device is connected to a ground via a conductor and the second wireless communication device is connected to the ground via at least part of the conductor.

8. The electronic device of claim 1, further comprising a housing that houses the first wireless communication device and the second wireless communication device.

9. The electronic device of claim 8, wherein
    the housing comprises an air inlet, and
    an orientation of at least one of the first planar substrate or the second planar substrate is different from a direction of inlet air through the air inlet.

10. The electronic device of claim 1, wherein a signal received by one of the first wireless communication device or the second wireless communication device is transmitted from another of the first wireless communication device and the second wireless communication device.

11. A communication method for an electronic device comprising:
- a first array antenna comprising a plurality of first antenna elements on a first planar substrate;
- a first wireless communication device that communicates via a first frequency band by the first array antenna;
- a second array antenna comprising a plurality of second antenna elements on a second planar substrate, an orientation of the second array antenna being different from an orientation of the first planar substrate; and
- a second wireless communication device that communicates via a second frequency band by the second array antenna, wherein
- the second frequency band is lower than the first frequency band, and
- a size of the plurality of the second antenna elements or a distance of the plurality of the second antenna elements is larger than a size of the plurality of the first antenna elements or a distance of the plurality of the first antenna elements, the method comprising:
- transmitting an electromagnetic wave with a first power by the first wireless communication device; and
- transmitting an electromagnetic wave with a second power by the second wireless communication device, the second power being larger than the first power.

12. The method of claim 11, wherein a signal received by one of the first wireless communication device or the second wireless communication device is transmitted from another of the first wireless communication device and the second wireless communication device.

\* \* \* \* \*